(12) United States Patent
Jin et al.

(10) Patent No.: US 9,664,754 B2
(45) Date of Patent: May 30, 2017

(54) SINGLE CHIP PUSH-PULL BRIDGE-TYPE MAGNETIC FIELD SENSOR

(75) Inventors: Insik Jin, Zhangjiagang (CN);
Xiaofeng Lei, Zhangjiagang (CN);
James Geza Deak, Zhangjiagang (CN);
Weifeng Shen, Zhangjiagang (CN);
Songsheng Xue, Zhangjiagang (CN);
Wei Li, Zhangjiagang (CN)

(73) Assignee: MultiDimension Technology Co., Ltd., Zhangjiagang (CN)

( * ) Notice: Subject to any disclaimer, the term of this patent is extended or adjusted under 35 U.S.C. 154(b) by 55 days.

(21) Appl. No.: 14/009,912

(22) PCT Filed: Apr. 1, 2012

(86) PCT No.: PCT/CN2012/073495
§ 371 (c)(1),
(2), (4) Date: Oct. 4, 2013

(87) PCT Pub. No.: WO2012/136134
PCT Pub. Date: Oct. 11, 2012

(65) Prior Publication Data
US 2014/0035570 A1 Feb. 6, 2014

(30) Foreign Application Priority Data

Apr. 6, 2011 (CN) .................. 2011 2 0097042 U
Oct. 25, 2011 (CN) ..................... 2011 1 0326725

(51) Int. Cl.
*G01R 33/02* (2006.01)
*G01R 33/09* (2006.01)
(Continued)

(52) U.S. Cl.
CPC ............. *G01R 33/09* (2013.01); *G01D 5/145* (2013.01); *G01R 33/098* (2013.01); *H01L 27/22* (2013.01);
(Continued)

(58) Field of Classification Search
CPC ............... G06Q 10/00; G06Q 2220/00; G06Q 2230/00; G07F 1/00
(Continued)

(56) References Cited

U.S. PATENT DOCUMENTS 4,841,235 A * 6/1989 Hastings et al. .......... 324/117 R
4,860,432 A * 8/1989 Kawata ....................... 29/602.1
(Continued)

FOREIGN PATENT DOCUMENTS

CN         2657206        11/2004
CN       101672903 A       3/2010
(Continued)

OTHER PUBLICATIONS

"International Application Serial No. PCT/CN2012/073495, International Preliminary Report on Patentability dated Oct. 8, 2013", (w/English Translation), 17 pgs.
(Continued)

*Primary Examiner* — Jermele M Hollington
*Assistant Examiner* — Temilade Rhodes-Vivour
(74) *Attorney, Agent, or Firm* — Schwegman Lundberg & Woessner, P.A.

(57) ABSTRACT

The present invention discloses a design of a single-chip push-pull bridge sensor, composed of magnetoresistive elements, utilizing on-chip permanent magnets. The permanent magnets are oriented to preset magnetization directions of free layers of adjacent sensor bridge arms so that they point to different directions with respect the same sensing direction, enabling push-pull operation. The push-pull bridge sensor of the present invention is integrated on a single chip. Additionally, an on-chip coil is disclosed to reset or calibrate the magnetization directions of the free layers of the magnetoresistive elements.

17 Claims, 8 Drawing Sheets

(51) Int. Cl.
*H01L 27/22* (2006.01)
*H01L 43/08* (2006.01)
*G01D 5/14* (2006.01)
*G07F 1/00* (2006.01)
*G06Q 10/00* (2012.01)

(52) U.S. Cl.
CPC ............ *H01L 43/08* (2013.01); *G06Q 10/00* (2013.01); *G06Q 2220/00* (2013.01); *G07F 1/00* (2013.01)

(58) Field of Classification Search
USPC ........................................................ 324/252
See application file for complete search history.

(56) References Cited

U.S. PATENT DOCUMENTS

| | | | | |
|---|---|---|---|---|
| 6,020,738 | A * | 2/2000 | Van Den Berg | B82Y 25/00 324/252 |
| 6,246,233 | B1 * | 6/2001 | Griffen | G01D 5/145 324/207.12 |
| 7,176,679 | B2 * | 2/2007 | Baragatti | G01R 33/09 324/252 |
| 7,615,994 | B2 * | 11/2009 | Butzmann | G01D 5/147 324/207.21 |
| 2003/0173955 | A1 * | 9/2003 | Uenoyama | G01D 5/142 324/207.21 |
| 2004/0130323 | A1 | 7/2004 | Oohashi et al. | |
| 2004/0165319 | A1 | 8/2004 | Wan et al. | |
| 2004/0174164 | A1 * | 9/2004 | Ao | G01D 5/145 324/252 |
| 2004/0231135 | A1 | 11/2004 | Oohashi et al. | |
| 2004/0239318 | A1 * | 12/2004 | Xiao | B82Y 35/00 324/244 |
| 2006/0081954 | A1 * | 4/2006 | Tondra | G01R 33/1276 257/421 |
| 2008/0272771 | A1 | 11/2008 | Guo et al. | |
| 2009/0189601 | A1 | 7/2009 | Okada et al. | |
| 2009/0315543 | A1 * | 12/2009 | Guo | G01D 5/145 324/207.21 |
| 2010/0253330 | A1 | 10/2010 | Sasaki et al. | |
| 2011/0187350 | A1 * | 8/2011 | Ausserlechner | G01D 5/145 324/202 |
| 2014/0021571 | A1 | 1/2014 | Lei et al. | |
| 2014/0035573 | A1 | 2/2014 | Deak et al. | |

FOREIGN PATENT DOCUMENTS

| | | |
|---|---|---|
| CN | 102226835 A | 10/2011 |
| CN | 102226836 A | 10/2011 |
| CN | 202013413 U | 10/2011 |
| CN | 102331564 A | 1/2012 |
| EP | 1227526 | 7/2002 |
| EP | 1411365 | 4/2004 |
| EP | 1574870 | 9/2005 |
| EP | 1860451 | 11/2007 |
| JP | H05-281319 | 10/1993 |
| JP | 2004-163419 | 6/2004 |
| JP | 2011-103336 A | 5/2011 |
| WO | WO-2012/136134 A1 | 10/2012 |

OTHER PUBLICATIONS

"International Application Serial No. PCT/CN2012/073495, International Search Report mailed Jul. 5, 2012", (w/ English Translation), 8 pgs.

"International Application Serial No. PCT/CN2012/073495, Written Opinion mailed Jul. 5, 2012", (w/ English Translation), 15 pgs.

"European Application No. 12767718.5, Extended European Search Report mailed May 11, 2015", (May 11, 2015), 7 pgs.

"European Application No. 12767718.5, Response to Extended European Search Report filed Nov. 11, 2015", (Nov. 11, 2015), 5 pgs.

"Japanese Application No. 2014-502976, Office Action mailed Oct. 29, 2015", (Oct. 29, 2015), 7 pgs.

\* cited by examiner

SINGLE CHIP PUSH-PULL BRIDGE-TYPE MAGNETIC FIELD SENSOR

CROSS-REFERENCE TO A RELATED APPLICATION

This application is a 35 U.S.C. §371 national phase application of PCT/CN2012/073495, filed on Apr. 1, 2012, which claims priority to a Chinese Patent Application No. CN 201120097042, filed on Apr. 16, 2011, and a Chinese Patent Application No. CN201110326725, filed on Oct. 25, 2011, incorporated herein by reference in its entirety.

TECHNICAL FIELD

The invention relates to a magnetic field sensors, in particular single-chip push-pull magnetic field sensor bridges.

BACKGROUND ART

Magnetic field sensors can be used to detect magnetic field direction, intensity, and the location of magnetic objects. Magnetoresistive sensors can be used to produce a high performance push-pull sensor bridge with the advantages of low offset, high sensitivity, and good temperature stability. Magnetic tunnel junction (MTJ) sensors are a new type of magnetoresistive sensor which has been used recently in various applications It utilizes a magnetic multilayer and the magnetoresistance effect is called tunneling magnetoresistance (TMR), The TMR effect is related to the magnetic orientation of magnetization of the ferromagnetic layers making up the magnetic multilayer, TMR is advantageous since it is a larger magnetoresistance effect than that of commonly used technologies such as anisotropic magnetoresistance (AMR) effect, giant magnetoresistance (GMR) effect, or the Hall Effect, thereby producing a larger signal. When compared to the Hall Effect TMR has better temperature stability. TMR has a further advantage of high resistivity and therefore can have very low power consumption. To summarize, MTJ devices have higher sensitivity, lower power consumption, better linearity, wider dynamic range, and better thermal compensation characteristics than AMR, GMR, or Hall devices. Due to its high sensitivity, the resulting noise performance of TMR sensors is better. In addition MTJ materials can be fabricated using existing semiconductor processes thereby providing the capability to produce MTJ sensors with very small size.

It is common to use a push-pull sensor bridge rather than a single sensor element in order to produce a magnetic field sensor, since bridge sensors have higher sensitivity, and because a bridge configuration removes offset and suppresses thermal effects magnetoresistive This however is not ideal for manufacturing, since there are no standard methods for setting the magnetization direction of the adjacent arms. Present techniques for manufacturing magnetoresistive sensor push-pull bridges are as follows:

(1) Double Deposition: Here, two deposition processes are used to deposit GMR or TMR films which have differently oriented pinned layers onto the same wafer. This method is complex production process, depending on the specific nature of the films, if a second anneal is needed; it can significantly affect the deposition of the first film. Because two separate deposition steps are used, it is difficult to match the resistance and performance of bridge legs built form the different films, degrading the overall performance of the sensor;

(2) Multi-Chip Packaging Technology: In this process, two or more sensor chips diced from the same wafer are packed together so that their resistance and performance characteristics are well-matched, but during packaging one is rotated relative to the other by 180° in a multi-chip package, in order to produce a push-pull half bridge. This method produces reasonably well-behaved push-pull bridges with good sensitivity and fair temperature compensation. However, because of the multi-chip packaging technology there are performance and cost disadvantages. The package size large; production costs are high; alignment is difficult and it is not always possible to achieve an accurate 180° flip; If the sensor chips are not properly aligned at 180°, then the performance characteristics of the two chips may not match well. In short, although the Multi-Chip Packaging process is standard and capable of producing good push-pull sensor bridges, it brings about cost and potential performance problems;

(3) Laser Assisted Local Magnetic Annealing: In this method, GMR or MTJ wafers are initially annealed at high temperature in a strong magnetic field, which sets the magnetization of the different bridge arms in the same direction. At a later step in the process, a scanning laser beam plus reversed magnetic field is used to locally heat the wafer in the regions where the pinned layer needs to be reversed. Although it sounds easy in concept, the local laser heating method requires special equipment that is not commercially available, and development of the equipment is expensive. The process is expensive to utilize, since it requires a long time to process an entire wafer. Performance is also an issue, since it can be difficult to properly match other performance of the push and pull sensor arms that result in the process, and the consistency of the different bridge arms cannot be guaranteed.

As illustrated above, there are few good options for producing low-cost MTJ or GMR sensor bridges with good performance using standard semiconductor processes.

SUMMARY OF THE INVENTION

The present invention provides a design and mass production method for single-chip push-pull magnetic field sensor bridges, which comprise a plurality of sensor arms composed of electrically interconnected magnetoresistive elements, which may be MTJ, AMR, or GMR elements. The magnetoresistive elements are sensitive to a magnetic field applied along an axis. Permanent magnets, which may be oriented at an angle with respect to the sensing axis, are provided to bias the magnetoresistive elements.

Preferably, the length of each permanent magnet is larger than the gap between adjacent permanent magnets in order to make the magnetic field between the permanent magnets uniform.

Preferably, each of the pair of the permanent magnets disposed on two sides of a magnetoresistive element has an edge closest to the magnetoresistive element, wherein the permanent magnet edge is set to form an angle with respect to the sensing direction of the magnetoresistive element, and said angle is either a sharp angle or an obtuse angle Preferably, the pair of the permanent magnets on the sides of the magnetoresistive element generate a magnetic bias field along a biasing direction.

Preferably, the thickness of the permanent magnets can be changed to change the bias field.

Preferably, each of the pair of the permanent magnets disposed on two sides of a magnetoresistive element has an edge closest to the magnetoresistive element, and the strength of the permanent magnet bias field can be adjusted by varying the orientation of the magnetization direction of the permanent magnet material or the angle of the edge boundary with respect to the sensing direction.

Preferably, the bias field provided by the permanent magnets is uniform.

Preferably, the magnetoresistive elements are parallel to each other.

Preferably, an electric coil is provided in the vicinity of the magnetoresistive elements in order to calibrate the sensor and compensate offset, and there is an insulation layer between the magnetoresistive elements and the electric coil.

FIGURES

DESCRIPTION OF THE PREFERRED EMBODIMENTS

With reference to FIGS. 1-13 below, preferred embodiments of the present invention will be described in detail so that the advantages and features of the present invention can be more easily understood by a person skilled in the art, and thus more clearly defining the scope of protection of the present invention.

Figure 1:
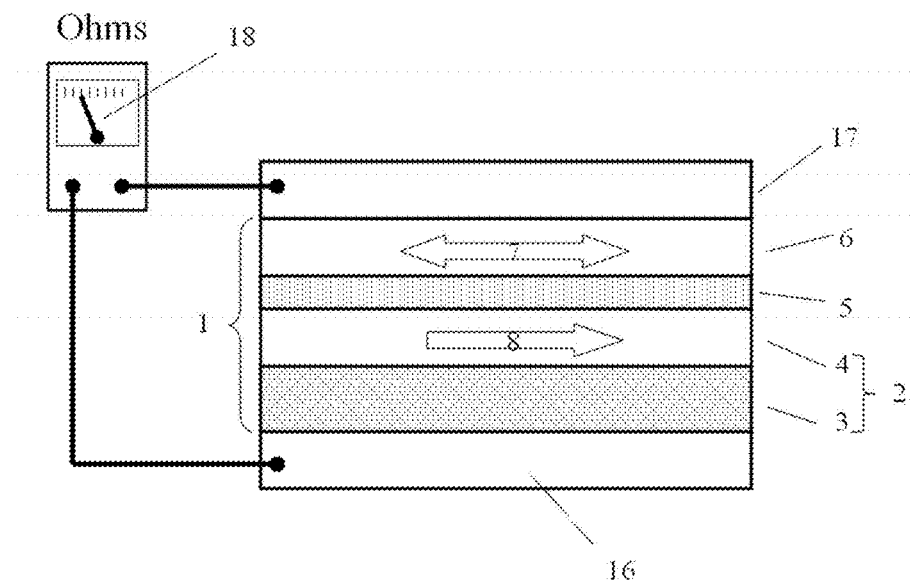
FIG. 1 is a schematic drawing of a magnetic tunnel junction.

FIG. 1 illustrates a standard MTJ element. A standard MTJ element 1 comprises a magnetic free layer 6 and a magnetic pinned layer 2, which are separated by a tunnel barrier layer 5. The free layer 6 is made from a ferromagnetic material, and the magnetization direction of the magnetic free layer 7 can change in response to a change of the external magnetic field. The pinned layer 2 magnetization direction does not change, and it is set into direction 8. A magnetic pinned layer is often comprised of antiferromagnetic layer 3 above or below a ferromagnetic layer 4. The MTJ structure is usually deposited on the conductive seed layer 16 and it is capped with an electrode layer on top of 17. The resistance of the MTJ element 16 is measured between the seed layer 17 and the upper electrode layer. The measured resistance value 18 of the MTJ represents the relative orientation between the free layer 6 and pinned layer 8 magnetization directions.

Figure 2:
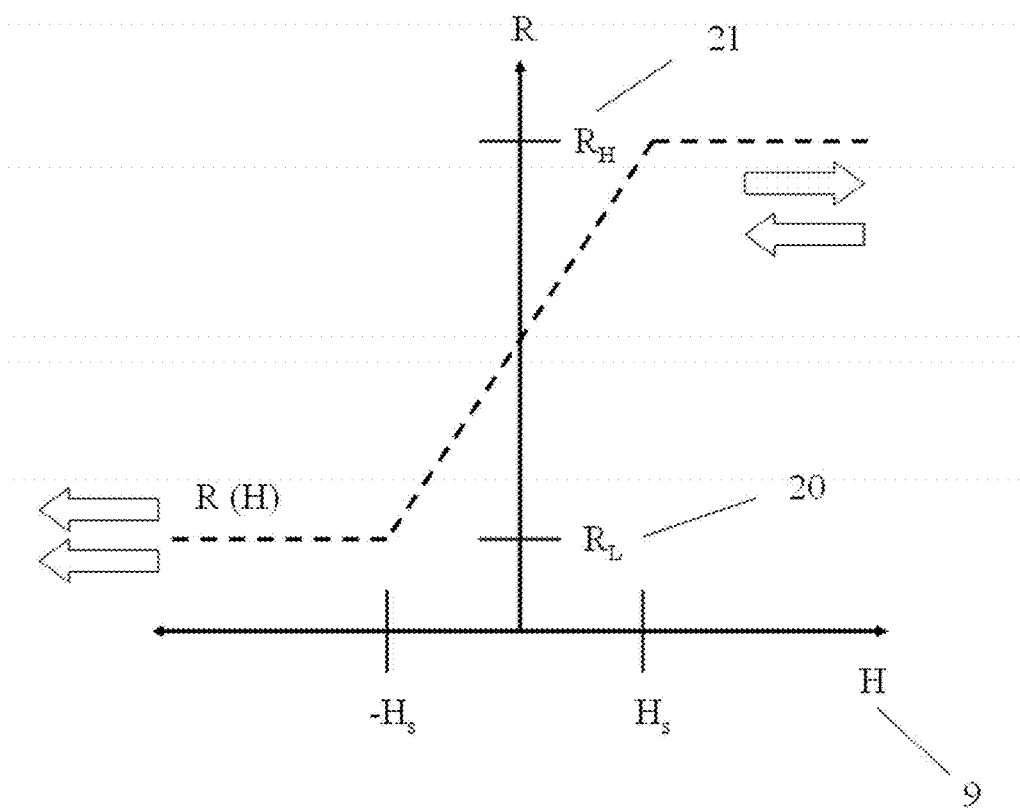
FIG. 2 is an ideal resistance as a function of magnetic field output response of a magnetic tunnel junction.

FIG. 2 illustrates the ideal output response of a MTJ element. In saturation, $R_L$ 20 and $R_H$ 21 represent low resistance and high resistance states. When the free layer 7 and pinned layer 8 magnetization are parallel, the measured resistance value 8 of the MTJ element is the low resistance state 20; when the magnetization direction of the free layer 7 and the pinned layer 8 are anti-parallel, the resistance value 18 of the MTJ element is the high resistance state 21. By known techniques, MTJ resistor element 1 may be made to show a resistance that varies linearly with applied magnetic field. The linear operating magnetic field range of the MTJ is between $H_s$ and $H_s$.

Figure 3:
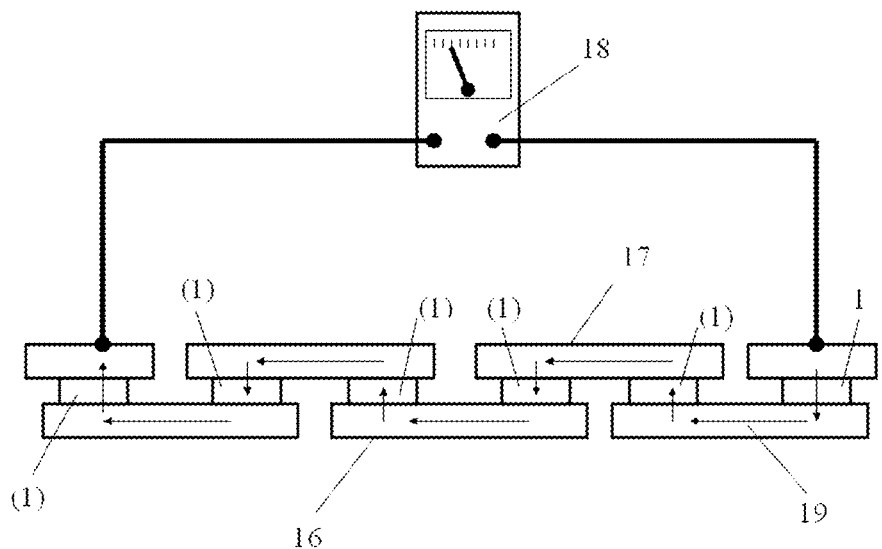
FIG. 3 shows how MTJs may be interconnected in series to form a bridge arm.

FIG. 3 illustrates the method for interconnecting MTJ elements in order to form a bridge arm. A long string of MTJ elements reduces sensor noise and improves stability of the device. This results because the bias voltage on each MTJ 1 in the chain of MTJs decreases with increasing number of MTJs. Additionally, the current required to produce a large output voltage is decreased as the number of MTJs increases, which decreases shot noise and improves ESD immunity. In addition, with the increasing number of MTJ elements 1, MTJ noise is further reduced, because the uncorrelated random fluctuations of each MTJ element average out.

Figure 4:
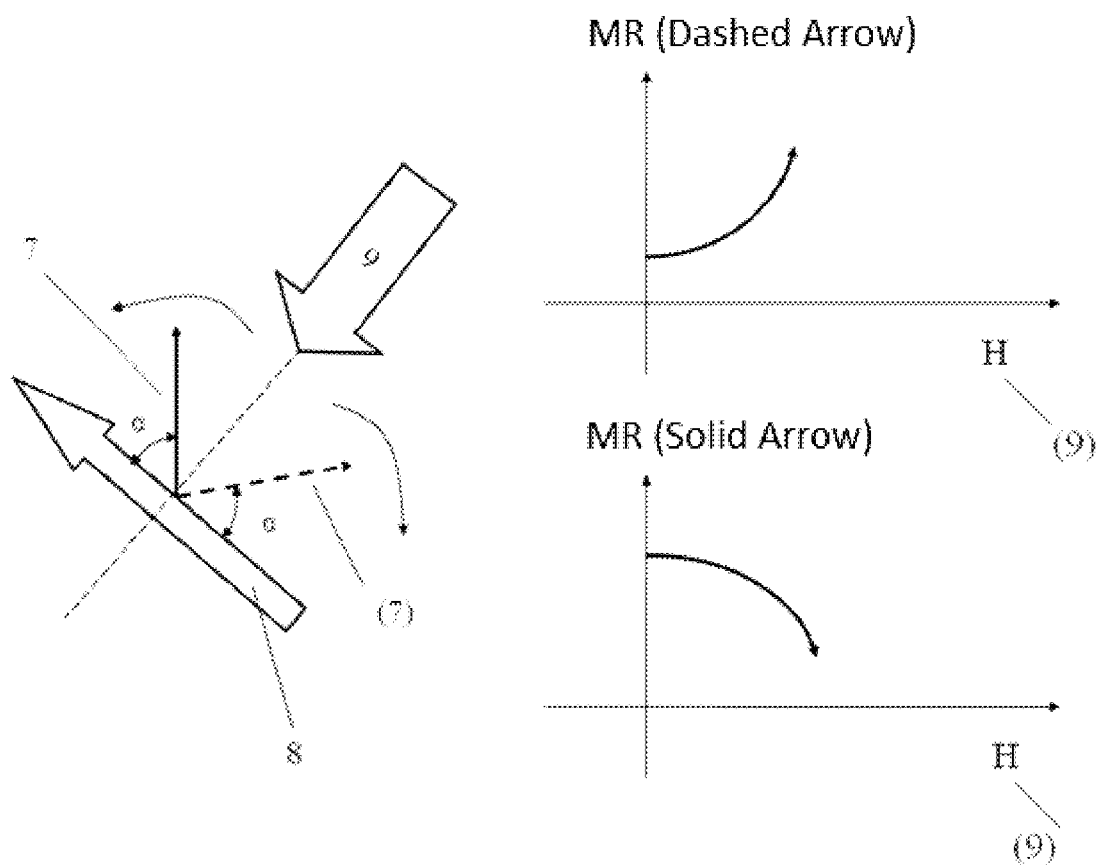
FIG. 4 shows the change in resistance of a MTJ structure in response to a magnetic field applied perpendicular to the pinned layer magnetization direction.

FIG. 4 shows the relative directions of the free layer and pinned layer magnetization. As shown, the magnetization direction of the free layers 7 and the pinned layer 8, are related by an angle α. A magnetic field applied along sensitive direction 9 produces a different response for the MTJ elements oriented at positive and negative α. By setting different permanent magnet bias field directions, the different free layers can be set at the correct angle with respect to the pinning layer magnetization direction 8. The magnetization direction 7 of the different free layers produced by the different magnetic bias fields causes the free layers of the MTJ elements to respond oppositely to applied magnetic field 9. The magnetization direction 7 (solid arrow in FIG. 4) rotates closer to parallel with the pinned layer magnetization direction 8, reducing the resistance of the corresponding MTJ element. The magnetization direction (7) (dashed arrow in FIG. 4) rotates closer to anti-parallel with the pinned layer magnetization direction 8, increasing the resistance of the corresponding MTJ element. It is therefore apparent; this design produces elements that have opposing response to an applied magnetic field.

Figure 5:
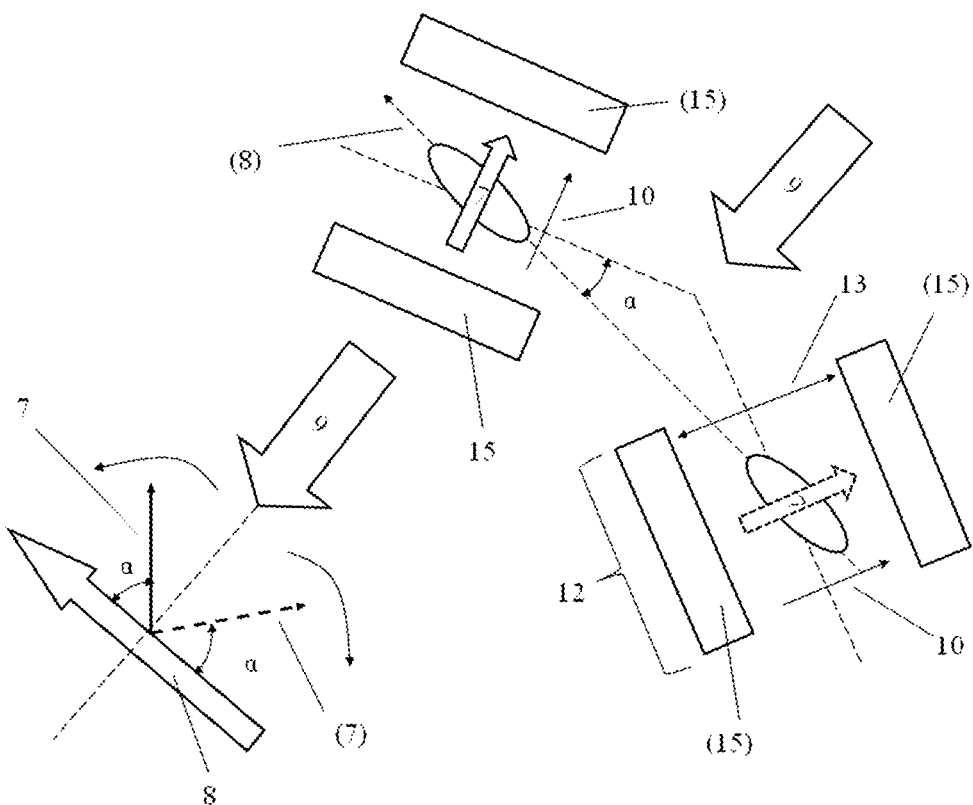
FIG. 5 shows two identical MTJs integrated on the same substrate and using permanent magnets in order to bias the free layers.

FIG. 5 illustrates the use of two strip-shaped permanent magnets to bias the magnetization direction of the free layers. Here, each permanent magnet 13 has a length that is large relative to the gap 12 between the magnets in order to avoid nonuniformity in fields which occurs at the ends of the gap. Although the permanent magnets are magnetized in the same direction, the bias fields in the gap 10 are perpendicular to the surface of the permanent magnets.

Figure 6:
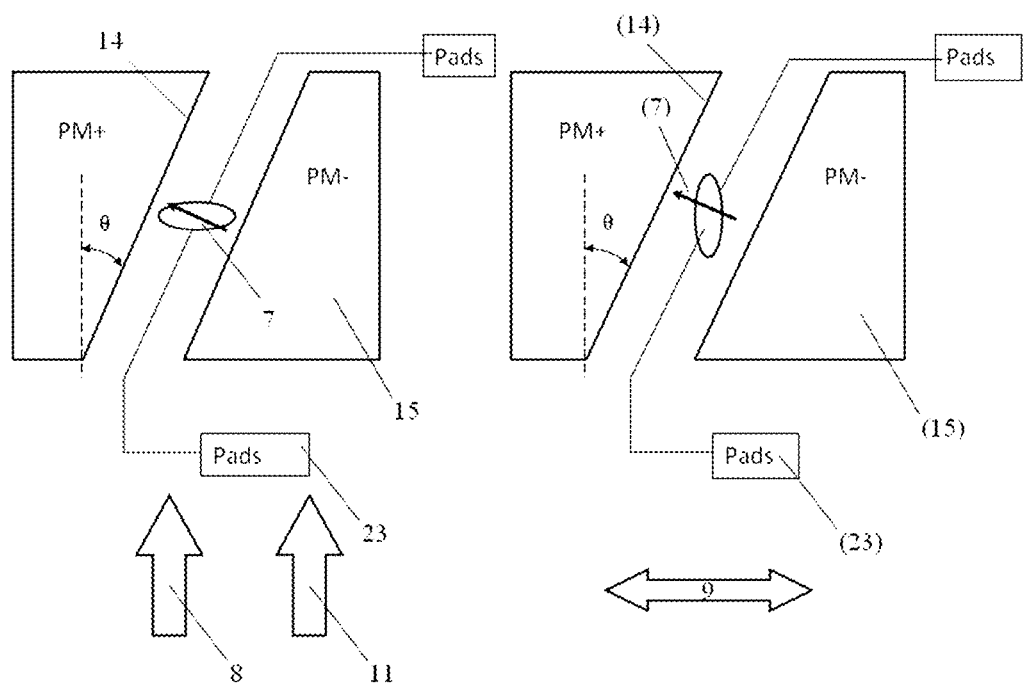
FIG. 6 shows the use of permanent magnets and shape anisotropy in order to bias the free layer of the different bridge arms.

FIG. 6 illustrates a design that uses permanent magnets and the shape anisotropy to control the magnetization direction of the free layers. Note the magnetization direction of the magnetic free layer 7 depends on both the shape anisotropy and the magnetic bias field 10. The shape of the magnetoresistive elements may be generally rectangular, diamond-like or elliptical. These oblong shapes produce anisotropy that tends to make the magnetization direction of the free layer 7 align along the long direction of the magnetoresistive element. The strength of the shape anisotropy may be controlled by changing the ratio of the major axis and the minor axis. The orientation of the magnetization is determined by the competing results of shape anisotropy and the magnetic bias field 10. The magnetic bias field 10 strength of the permanent magnets magnet depends on the surface magnetic pole density due to the alignment of the magnetization 11 of the permanent magnet, the closer the magnetization is to perpendicular to the interface 14, the surface magnetic charge density of greater accumulation, and the greater magnetic bias field produced at the MTJ element. Surface magnetic charge density is proportional to sin θ, where θ is the angle of the interface 14 and the permanent magnets 11 of the angle between the magnetization directions. By adjusting the magnetic bias field 10 and the shape anisotropy of the magnetoresistive element, the magnetization of the magnetoresistive element can be preset angle α. In this design, the sensitivity direction 9 and the magnetic pinned layer 8 perpendicular to the magnetization direction.

Figure 7:
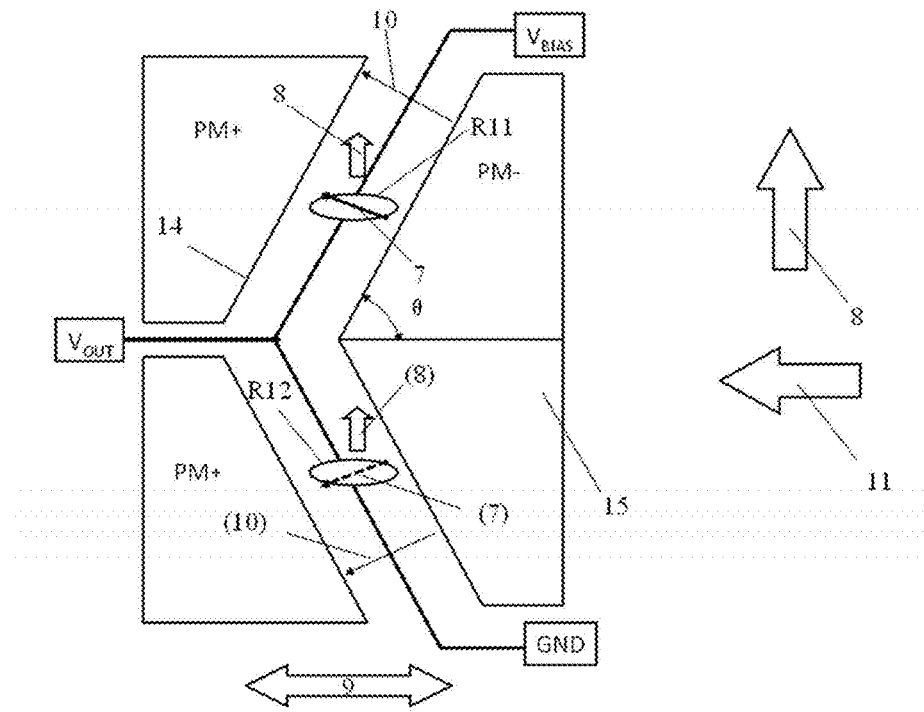
FIG. 7 shows the design concept for a half-bridge push-pull magnetic field sensor.

FIG. 7 shows the design concept for a half-bridge push-pull magnetic field sensor. As shown, the magnetic resistors R11 and R12 constitute a half-bridge. Both bridge arms share the same pinned layer direction 8. The two magnetoresistive elements comprising the bridge arms have magnetization tilted in opposite directions 7 by the same angle α. The magnetization direction of the magnetic free layer direction 7 depends on the competition between shape anisotropy and the magnetic bias field 10. When this half-bridge push-pull sensor is subjected to a magnetic field along the direction 9, the magnetization 7 of the free layer of R11 rotates into the direction parallel to the pinned layer magnetization direction 8, and the resistance shows a corresponding decrease; simultaneously the free layer magnetization direction (7) of R12 rotates away from magnetic pinned layer magnetization direction 8, showing a corresponding increase in its resistance. When a constant voltage $V_{BIAS}$ is applied to bias the bridge, the output voltage $V_{OUT}$ of the bridge changes in response to the magnetic field. This is the expected response for a push-pull half bridge.

The biasing method for push-pull half bridge is as follows. First apply and remove a large magnetic field along direction 11 of push-pull half bridge as shown in FIG. 7 to set the magnetization of the permanent magnets. The resulting magnetic field 10 at the gap 13 between permanent magnets 15 generated by virtual magnetic charges at the edges 14 of the gaps is perpendicular to gap edges. Arrow 10 in FIG. 7 indicates the exact biasing direction.

Figure 8:
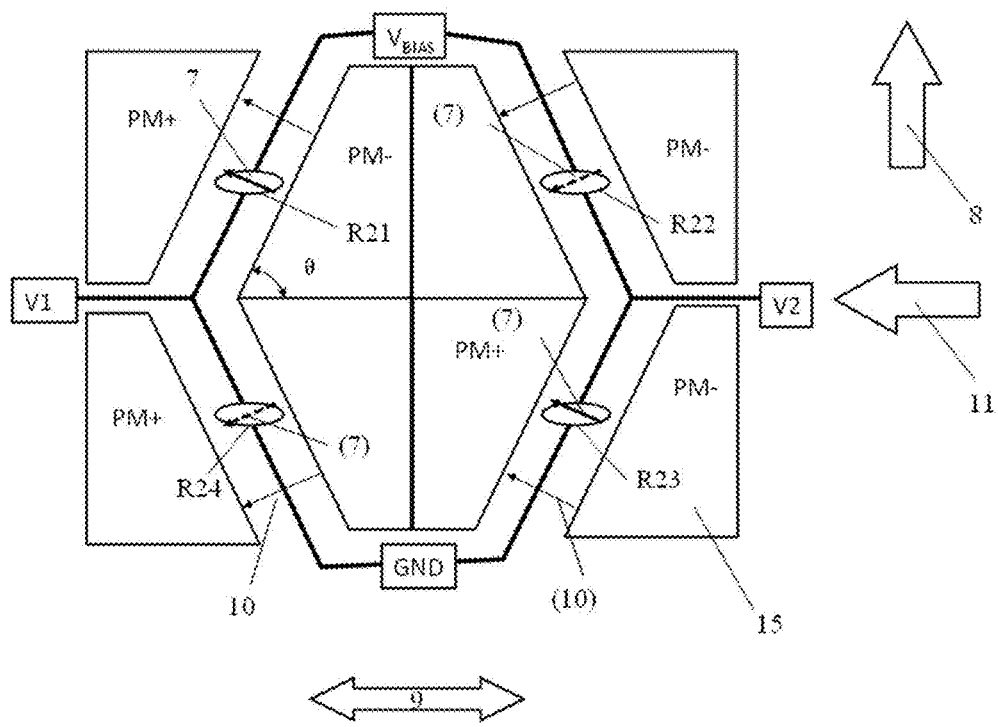
FIG. 8 shows the design concept for a full-bridge push-pull magnetic field sensor.

FIG. 8 shows a design sketch for a push-pull full bridge. Magnetoresistive elements R21, R22, R23 and R24 comprising bridge arms are connected in full bridge structure. The magnitude of the angle is the same for all bridge arms. The magnetic pinning layers of the 4 bridge arms have the same magnetization direction 8. The magnetic moments 7 of free layer of opposite bridge arm magnetoresistive elements (R21 opposite to R23, R22 opposite to R24) are parallel. The magnetization direction of adjacent bridge arm free layers 7 (R21 and R22; R22 and R23; R23 and R24; R24 and R21) are different. If a positive magnetic field is applied to the push-pull full-bridge along its sensing direction 9, then the magnetic moment 7 of free layer in magnetoresistive elements R21 and R23 will rotate into the pinned layer magnetization direction 8, which causes the resistance of R21 and R23 to decrease; meanwhile, magnetic moment (7) of the free layers of magnetoresistive elements R22 and R24 will rotate into the direction opposite to pinned layer magnetization direction 8, thereby causing the resistance of R21 and R23 to increase. When a constant voltage $V_{BIAS}$ is applied to the bridge, the voltage between terminals V1 and V2 will change in opposition. This produces the push-pull effect. Ideally, if the resistances of R21 and R23 change as (R1+ΔR), while resistances of R21 and R23 change as (R2−ΔR), then the output of the sensor is:

$$V1 - V2 = \frac{R2 - \Delta R - (R1 + \Delta R)}{R2 + R1} V_{bias} \quad (1)$$

Ideally, R1=R2≫ΔR, and the equation reduces to:

$$V1 - V2 \approx \frac{-2\Delta R}{R2 + R1} V_{bias} \quad (2)$$

Thereby showing full-bridge push-pull response.

The method of biasing the push-pull full bridge magnetic field sensor is explained as follows: First, apply and remove a magnetizing field along axis indicated by 11 to set the permanent magnets for push-pull full bridge as shown in FIG. 8. The resulting magnetic field 10 at the gap 10 between permanent magnet 15 and will be produced by virtual magnetic charge at the edges of the magnets, resulting in a bias field that is perpendicular to edge 14. Arrow 10 in FIG. 8 indicates the exact biasing direction.

As observed by comparing FIGS. 7 and 8, the direction of the pinned layer magnetization 8 of pinning layer in push-pull full bridge sensor is the same for all bridge arms. This shows it is possible to manufacture a push-pull full-bridge sensor on one single chip and one single process. There is no need for complicated multichip assembly process, local laser annealing, or double deposition.

Figure 9:
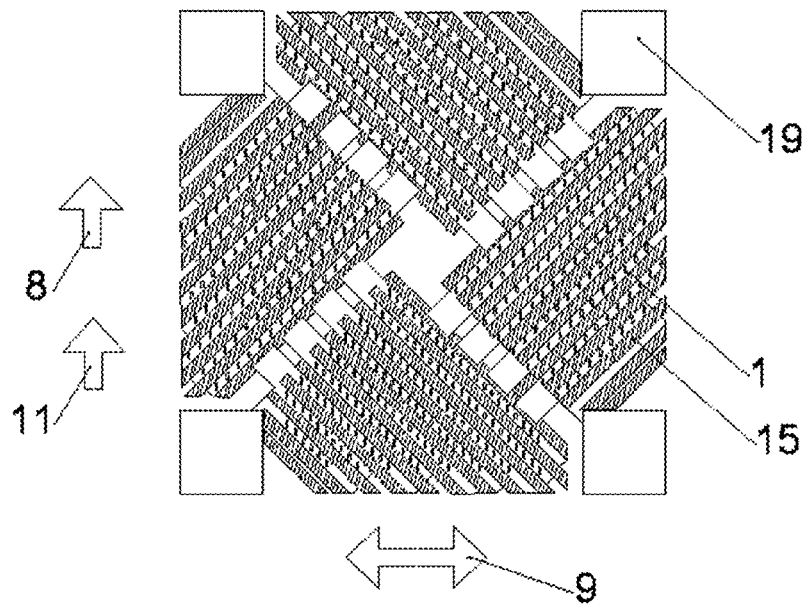
FIG. 9 shows one possible layout for a full-bridge push-pull sensor.

FIG. 9 shows sketch of the layout for push-pull full-bridge magnetic field sensor. Several MTJ elements 1 are connected in series, as shown in the figure, to form the bridge arms. If the permanent magnet is properly magnetized, the free layer will be biased by magnetic field 10 produced by permanent magnet 15 on both sides of MTJ elements 1. The sensor bridge has a sensitive direction 9 that is perpendicular to its pinning layer magnetization direction 8. Pads 23 of the sensor can be connected to ASIC or pins of lead frame through bonding wires.

Figure 10:
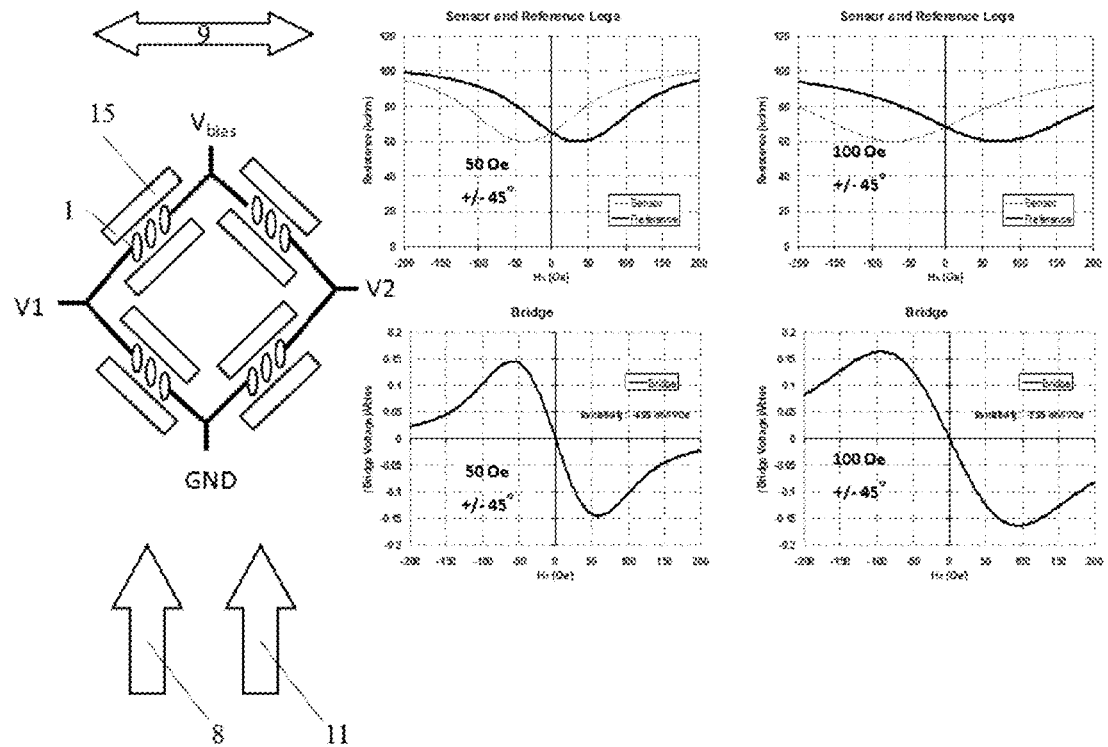
FIG. 10 illustrates a full-bridge push-pull sensor with the sensitive direction perpendicular to the easy-axis of the sensor element.

FIG. 10 shows an alternative design of push-pull bridge which sensitive direction is perpendicular to its easy axis, as well as its simulated output. The upper two figures are outputs of two adjacent magnetoresistive elements when the field from the permanent magnets is respectively 50 Oe and 100 Oe. The lower two figures are full bridge outputs with saturate field when using the corresponding 50 Oe and 100 Oe bias fields.

Figure 11:
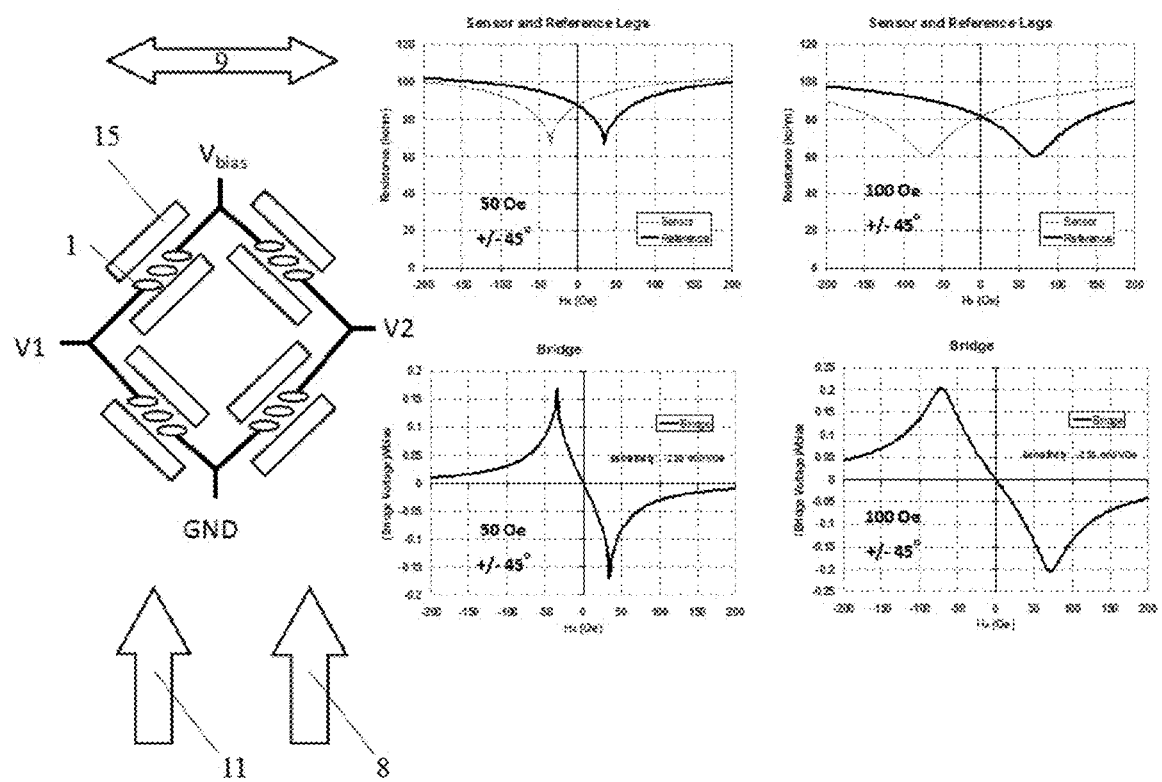
FIG. 11 illustrates a full-bridge push-pull sensor with the sensitive direction parallel to the easy-axis of the sensor element.

FIG. 11 shows a design of push-pull bridge which sensitive direction is parallel to its easy axis, as well as its simulated output. The upper two figures are outputs of two adjacent magnetoresistive elements when the bias field from the permanent magnet is respectively 50 Oe and 100 Oe. The lower two figures show the full-bridge outputs at the corresponding 50 Oe and 100 Oe bias fields.

Figure 12:
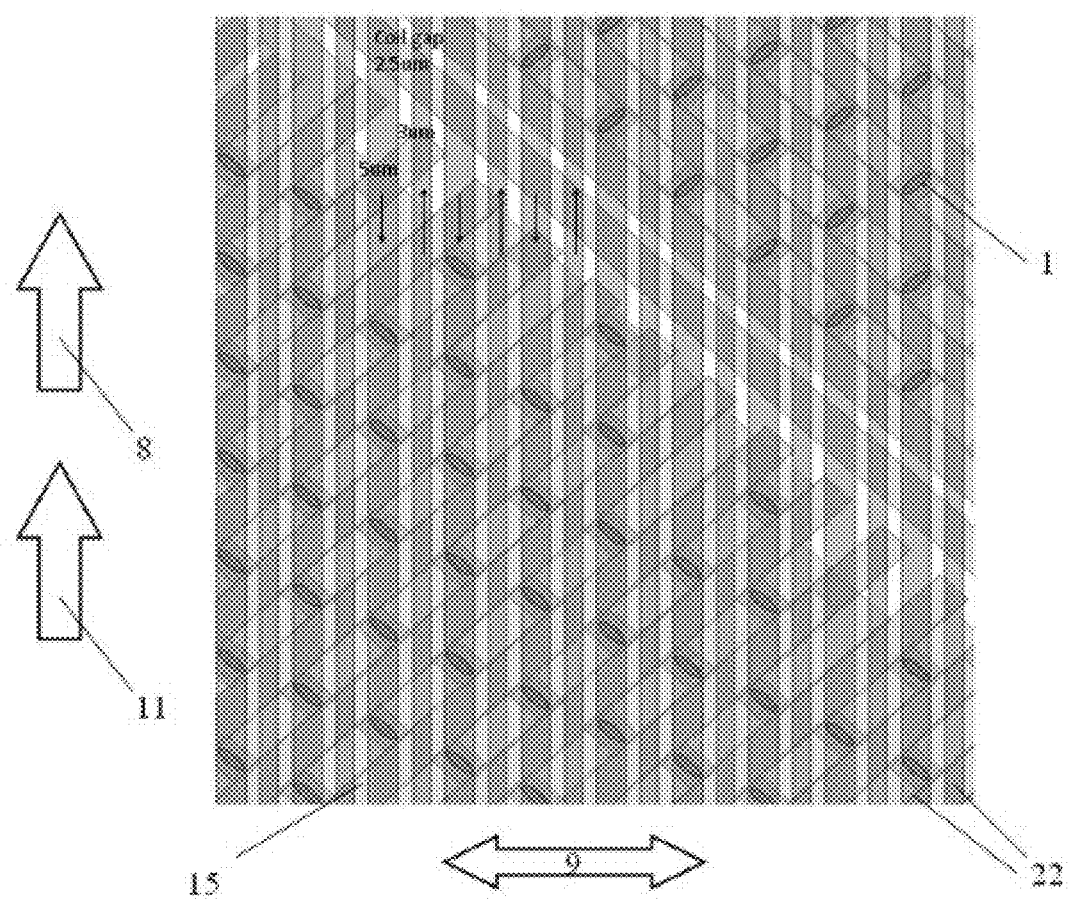
FIG. 12 shows a plan for integrating a coil that can be used for offset compensation and calibration.

Usually in the actual measurement, MTJ output curve is not ideal curve shown in FIG. 2, and there is a certain offset. In practice, the external field can be applied to saturate the sensor in opposite directions to provide a means for measuring the offset calibration. FIG. 12 shows a design with the coil 22 disposed above the magnetoresistive element. When the coil 22 is energized the magnetic field produced is applied to the fee layer, similarly to the external field. This current controlled field is designed to be implemented after the chip package is prepared to calibrate and compensate offset of the output and thermal drift. It can be performed from time to time in accordance with the actual needs of the user. As shown, the calibration field generated line width of the wire 5 µm, and the calibration current reverse the wire width is 3 µm, the gap width between the wires 2.5 µm.

Figure 13:
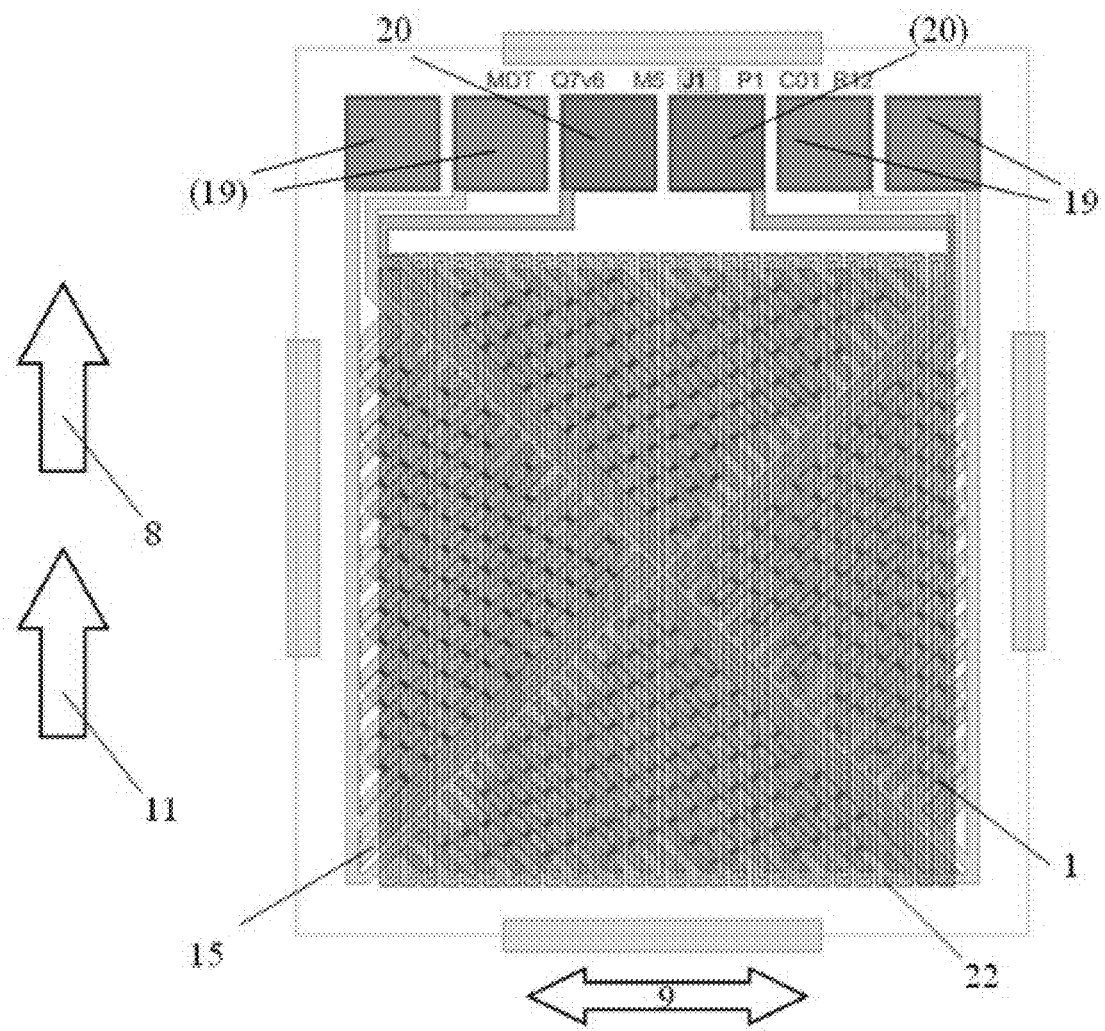
FIG. 13 shows the layout of a coil that may be used for offset compensation and calibration.

FIG. 13 shows the magnetic field produced by the preset and calibration coil, compared to the magnetization direction of the free layers. As shown, the sensor pad 23 may be connected to an ASIC circuit through lead or lead frame of the package pins. Pads 24 are used for coil inputs and outputs.

Although a few embodiments of the present invention have been described, it would be appreciated by those skilled in the art that changes may be made in these embodiments without departing from the principles and spirit of the present invention, the scope of which is defined in the claims and their equivalents.

The invention claimed is:

1. A single-chip push-pull magnetoresistive sensor bridge, comprising
a sensor bridge comprised of magnetoresistive sensor arms, wherein each magnetoresistive sensor arm comprises multiple magnetic tunnel junction (MTJ) or giant magnetoresistance (GMR) magnetoresistive elements, each of the magnetoresistive elements has a magnetic pinned layer that has a same pinned layer magnetization direction as the other magnetoresistive elements, each of the magnetoresistive elements has a free layer that has a magnetization direction, and each of the magnetoresistive elements is sensitive to a magnetic field along a sensing direction that is perpendicular to the pinned layer magnetization direction; and
permanent magnets disposed on two sides of each of the magnetoresistive sensor arms to bias the direction of the magnetization of the multiple magnetoresistive elements in each of the magnetoresistive sensor arms, wherein the permanent magnets are oriented to provide for each sensor arm a magnetic bias used to preset the magnetization direction of the free layer for the respective sensor arm, and the permanent magnets provide magnetic biases in different directions for adjacent sensor arms to preset the magnetization direction of the free layer for adjacent sensor arms in different directions, the preset magnetization direction of the free layer for adjacent sensor arms being either a sharp angle or obtuse angle with respect to the sensing direction such that the preset magnetization is not aligned with either of the sensing direction or the pinned layer magnetization direction.

2. A single-chip push-pull magnetoresistive sensor bridge as claimed in claim 1, wherein the length of each permanent magnet is larger than the gap between adjacent permanent magnets in order to make the magnetic field between the permanent magnets uniform.

3. A single-chip push-pull bridge magnetoresistive sensor as claimed in claim 1, wherein a first sensor arm has a preset magnetization of direction that has a first rotational angle from the sensing direction, and the second sensor arm has a preset magnetization direction that has a second rotational angle from the sensing direction that is equal in magnitude and opposite in direction from the first rotational angle.

4. A single-chip push-pull magnetoresistive sensor bridge as claimed in claim 1, wherein each magnetoresistive element has a shape anistropy, and for each sensor arm the preset magnetization direction is determined by the shape anistropy of the magnetoresistive elements in the sensor arm and a direction of the magnetic bias provided by the permanent magnets disposed on the two sides of the sensor arm.

5. A single-chip push-pull magnetoresistive sensor bridge as claimed in claim 1, wherein the magnitude of the magnetic bias field is dependent on the thickness of the permanent magnets.

6. A single-chip push-pull magnetoresistive sensor bridge as claimed in claim 1, wherein each of the pair of the permanent magnets disposed on two sides of a magnetoresistive element has an edge closest to the magnetoresistive element, and the strength of the permanent magnet bias field can be adjusted by varying the orientation of the magnetization directions of the permanent magnets or the angle of the edge boundary with respect to the sensing direction.

7. A single-chip push-pull magnetoresistive sensor bridge as claimed in claim 1, wherein the bias field provided by the permanent magnets is uniform.

8. A single-chip push-pull magnetoresistive sensor bridge as claimed in claim 1, wherein the magnetoresistive elements are parallel to each other.

9. A single-chip push-pull magnetoresistive sensor bridge as claimed in claim 1, further comprising an electric coil in the vicinity of the magnetoresistive elements, wherein there is an insulation layer between the magnetoresistive elements and the electric coil.

10. A single-chip push-pull magnetoresistive sensor bridge, comprising
a sensor bridge comprised of magnetoresistive sensor arms, each magnetoresistive sensor arm comprising a string of MTJ elements, each of the MTJ elements has a magnetic pinned layer that has a same pinned layer magnetization direction as the other MTJ elements, each of the MTJ elements have a free layer that has a magnetization direction, and each of the MTJ elements is sensitive to a magnetic field along a sensing direction that is perpendicular to the pinned layer magnetization direction; and
permanent magnet bars disposed on two sides of each string of MTJ elements to bias the direction of the magnetization of each MTJ element in the string of MTJ elements, wherein the permanent magnet bars are oriented to provide for each sensor arm a magnetic bias used to preset the magnetization direction of the free layer for the respective sensor arm, and the permanent magnet bars provide magnetic biases for adjacent sensor arms in different directions to preset the magnetization direction of the free layer for adjacent sensor arms in different directions, the preset magnetization direction of the free layer for adjacent sensor arms being either a sharp angle or obtuse angle with respect to the sensing direction such that the preset magnetization is not aligned with either of the sensing direction or the pinned layer magnetization direction.

11. A single-chip push-pull magnetoresistive sensor bridge as claimed in claim 10, wherein the permanent magnet bars is a pair of permanent magnet bars on opposing sides of each string of MTJ elements.

12. A single-chip push-pull magnetoresistive sensor bridge as claimed in claim 11, wherein the pair of permanent magnet bars are parallel to each other, forming a gap between the pair of permanent magnet bars, wherein each of the pair of permanent magnet bars has a length longer than the gap.

13. A single-chip push-pull magnetoresistive sensor bridge as claimed in claim 10, further comprising bonding pads.

14. A single-chip push-pull magnetoresistive sensor bridge as claimed in claim 10, further comprising an electric coil in the vicinity of the magnetoresistive elements, wherein there is an insulation layer between the magnetoresistive elements and the electric coil.

15. A single-chip push-pull magnetoresistive sensor bridge, comprising
   a sensor bridge comprised of magnetoresistive sensor arms, each magnetoresistive sensor arm comprising a string of series-connected MTJ elements, each of the MTJ elements has a magnetic pinned layer that has a same pinned layer magnetization direction as the other MTJ elements, each of the MTJ elements have a free layer that has a magnetization direction, and each of the MTJ elements is sensitive to a magnetic field along a sensing direction that is perpendicular to the pinned layer magnetization direction; and
   a plurality of permanent magnet bars, including a pair of parallel permanent magnet bars proximate to each string of MTJ elements, the pair of parallel permanent magnet bars forming a gap between the pair of parallel permanent magnet bars within which is the string of series-connected MTJ elements, wherein each of the pair of parallel permanent magnet bars has a length longer than the gap to uniformly bias the direction of the magnetization of each MTJ element in the string of MTJ elements, wherein the permanent magnet bars are oriented to provide for each sensor arm a magnetic bias used to preset the magnetization direction of the free layer for the respective sensor arm, and the permanent magnet bars provide magnetic biases for adjacent sensor arms in different directions to preset the magnetization direction of the free layer for adjacent sensor arms in different directions, the preset magnetization direction of the free layer for adjacent sensor arms being either a sharp angle or obtuse angle with respect to the sensing direction such that the preset magnetization is not aligned with either of the sensing direction or the pinned layer magnetization direction.

16. A single-chip push-pull magnetoresistive sensor bridge as claimed in claim 15, further comprising bonding pads.

17. A single-chip push-pull magnetoresistive sensor bridge as claimed in claim 15, further comprising an electric coil in the vicinity of the magnetoresistive elements, wherein there is an insulation layer between the magnetoresistive elements and the electric coil.

* * * * *

UNITED STATES PATENT AND TRADEMARK OFFICE
CERTIFICATE OF CORRECTION

PATENT NO. : 9,664,754 B2
APPLICATION NO. : 14/009912
DATED : May 30, 2017
INVENTOR(S) : Jin et al.

It is certified that error appears in the above-identified patent and that said Letters Patent is hereby corrected as shown below:

On the Title Page

In item (54), and in the Specification, in "Title", in Column 1, Line 1, delete "SINGLE CHIP" and insert --SINGLE-CHIP-- therefor In item (30), in "Foreign Application Priority Data", in Column 1, Line 1, delete "2011 2 0097042 U" and insert --201120097042.3-- therefor In item (30), in "Foreign Application Priority Data", in Column 1, Line 2, delete "2011 1 0326725" and insert --201110326725.6-- therefor Signed and Sealed this
Eighth Day of May, 2018

Andrei Iancu
*Director of the United States Patent and Trademark Office*